United States Patent
Lahr et al.

(10) Patent No.: US 8,021,136 B2
(45) Date of Patent: Sep. 20, 2011

(54) ANNULAR VENTING OF TIRE TREAD MOLDS

(75) Inventors: Nile A. Lahr, Findlay, OH (US); P. Glenn Arbaugh, Findlay, OH (US); John D. Corbin, Arcadia, OH (US)

(73) Assignee: Cooper Tire & Rubber Company, Findlay, OH (US)

( * ) Notice: Subject to any disclaimer, the term of this patent is extended or adjusted under 35 U.S.C. 154(b) by 834 days.

(21) Appl. No.: 10/537,326

(22) PCT Filed: Dec. 8, 2003

(86) PCT No.: PCT/US03/40153
§ 371 (c)(1),
(2), (4) Date: Aug. 8, 2006

(87) PCT Pub. No.: WO2004/052589
PCT Pub. Date: Jun. 24, 2004

(65) Prior Publication Data
US 2007/0009623 A1 Jan. 11, 2007

Related U.S. Application Data

(60) Provisional application No. 60/431,610, filed on Dec. 7, 2002.

(51) Int. Cl.
*B29C 33/10* (2006.01)
(52) U.S. Cl. ............ 425/46; 425/28.1; 425/35; 425/812
(58) Field of Classification Search ............. 425/46, 425/28.1, 35, 812
See application file for complete search history.

(56) References Cited

U.S. PATENT DOCUMENTS

| 4,691,431 A * | 9/1987 | Hayata ............... 76/101.1 |
| 5,261,804 A * | 11/1993 | Jachowsky ............ 425/47 |
| 5,798,076 A | 8/1998 | LaDouce |
| 6,382,943 B1 * | 5/2002 | Metz et al. ............ 425/46 |
| 6,632,393 B2 * | 10/2003 | Fike .................... 264/501 |
| 2002/0119209 A1 * | 8/2002 | Tanaka ................ 425/46 |

FOREIGN PATENT DOCUMENTS

| DE | 43 41 683 A1 | 6/1995 |
| JP | 01 258913 A | 10/1989 |
| JP | 02 295706 A | 12/1990 |
| JP | 02295706 A * | 12/1990 |
| JP | 11 300746 A | 11/1999 |

OTHER PUBLICATIONS

Supplementary European Search Report, Dec. 23, 2008.

* cited by examiner

*Primary Examiner* — Matthew Daniels
*Assistant Examiner* — Jacob Thomas Minskey
(74) *Attorney, Agent, or Firm* — Emch, Schaffer, Schaub & Porcello Co., L.P.A.

(57) ABSTRACT

The present invention differs fundamentally from prior art because it provides for machining a substantial number of relatively thin annular tooling plates (10), fitting them together side-by-side in two opposed mold sides, and engraving the tread pattern into the interior face of the assembled plates in two or more complementary mold parts to form a unique tire mold (12). In one form of the disclosed construction two halves are built up and internally engraved to form a two-piece clamshell mold. This building up of annular plates (10) applies also to the construction of segmented molds, wherein there are multiple complementary mold sections which are joined to provide a complete circumferential mold. Thus, the invention applies to both two-piece clamshell molds and segmented molds. The invention encompasses an all engraved mold and all venting (22) in the circumferential direction.

20 Claims, 5 Drawing Sheets

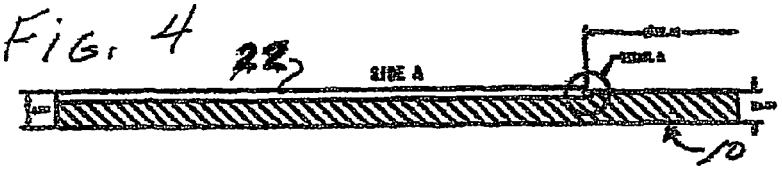
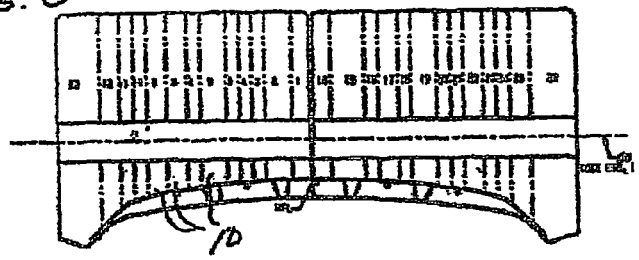
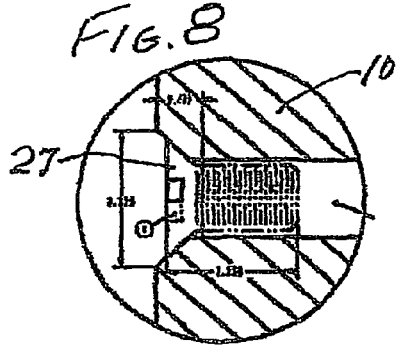
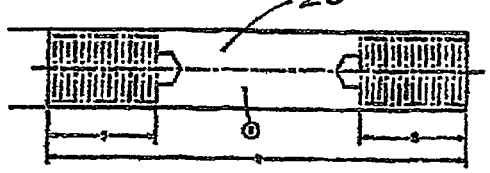

ANNULAR VENTING OF TIRE TREAD MOLDS

This application claims the priority benefit of U.S. provisional application Ser. No. 60/431,610, filed Dec. 7, 2002 and International Application Number PCT/US2003/040153, filed Dec. 8, 2003, the details of both being incorporated herein by reference.

BACKGROUND OF THE INVENTION

There are many advantages to producing tires with a smooth tread surface. Some tire companies produce their products using the 'puzzle' and 'vacuum' mold methods. The purpose of this invention is to produce tires with a smooth surface by venting the tire molds differently with a more economically desired and manufactured mold. This new method of venting will eliminate the offensive appearing rubber protrusions (nubbins) from the tread portion of a tire caused by drilled vents in prior art tire molds.

Prior art "ventless" molds are built by a technique known as a puzzle mold. In those, small die cast pieces are made and assembled together in sections in the lateral (or transverse) direction of the tire. In the molding process air escapes through the cavities that are formed when the die cast pieces are placed together. This mold construction is always a segmented mold, expensive, complex and time consuming.

Also, the tread area of presently used molds, both 2-piece clamshell and segmented, are air vented by means of round vents located in strategic locations in the interior mold tread surface and drilled through the mold to the exterior atmosphere. The uncured tread rubber is pressed against the cavity of the tread of the mold under great pressure and heat. When the air escapes from the mold, rubber is pressed into the drilled vents leaving rubber protrusions (nubbins) sticking out of the tire when the tire is released from the mold. Over time some of these rubber protrusions (nubbins) will break off in the mold and will not permit the air to escape, causing the rubber not to fill the tread cavity completely. This is called rubber lightness or non-fill. The mold is necessarily then removed from production and cleaned. The typical cleaning operation uses a drill to clean the rubber from each vent; a very time consuming procedure because there are usually 1500 to 3000 vents per mold.

Also, before shipment a tire label may be placed on each tread surface. Many times labels will not stick to the tire because these protrusions (nubbins) will not permit the label to adhere to the surface of the tire.

SUMMARY OF THE INVENTION

The present invention is fundamentally different from the prior art because it provides for machining a substantial number of relatively thin tool steel plates, fitting them together side-by-side in at least two opposed mold sides, providing gaps or vents therein, and machining or engraving the tread pattern into the interior face of the assembled plates to form a unique tire mold. In the disclosed construction two halves are built up and engraved to form a two-piece clam-shell mold. This building up of annular or arcuate plates will also easily apply to the construction of segmented molds, wherein there are multiple complementary mold sections which are joined to provide a complete circumferential mold. Thus, the invention applies to both two-piece clamshell molds and segmented molds. The invention incorporates an all engraved mold and all venting in the circumferential direction.

In a preferred embodiment, the multiple plates have the same inside diameter and the same outside diameter placed strategically across the tread arc of the mold. The plates have a special surface grind on one or both sides to form the gaps or vents. The plates are preferably pinned together so they cannot move relative to one another. The tread rings are then formed on an interior surface of the assembled plates. Air escapes through the vents when the tire is cured thereby providing a smooth tread surface.

An advantage of venting molds in this manner is a resulting smooth tread surface, more total venting area to release trapped air, and less time cleaning production molds.

This mold venting change can improve the following:

(a) Tire appearance—by eliminating the rubber protrusions (nubbins) from the tread surface.

(b) Tire label adhesion—by eliminating the rubber nubbins from the tread surface.

(c) Mold cost—by eliminating the drilling of vents (est. $1.00/vent) and reducing cost by using larger quantities of tooling plate rather than purchasing expensive cast forgings.

(d) Production cost—by reducing the time for each mold cleaning, and increased venting area that would reduce down grades due to rubber lightness.

(e) Production cost—by improving the number of cured tires produced between mold cleanings.

These advantages are applicable to the unique mold construction (fabrication) methods as well as to the resultant unique venting molds, themselves.

BRIEF DESCRIPTION OF THE DRAWINGS

FIG. 1A is an enlargement of a segment of FIG. 1 (as indicated) showing the venting spaces between the thin stacked plates;

FIGS. 3 and 4 are, respectively, a perspective view of a portion of the side surface of one plate, illustrating the venting relief surface which extends from the inner diameter of the plate, short of the outer diameter, and one of the radially extending vent passages in the outer portion of the plate, and a cross-sectional view through one of the plates;

FIG. 6 is a cross-sectional view through an assembly of the plates showing the aligned passages for the alignment pins; and FIGS. 7 and 8 are cross-sectional views of the alignment pins and associated flathead bolts which hold the stacked plates together.

DESCRIPTION OF THE PREFERRED EMBODIMENT

Figure 1:
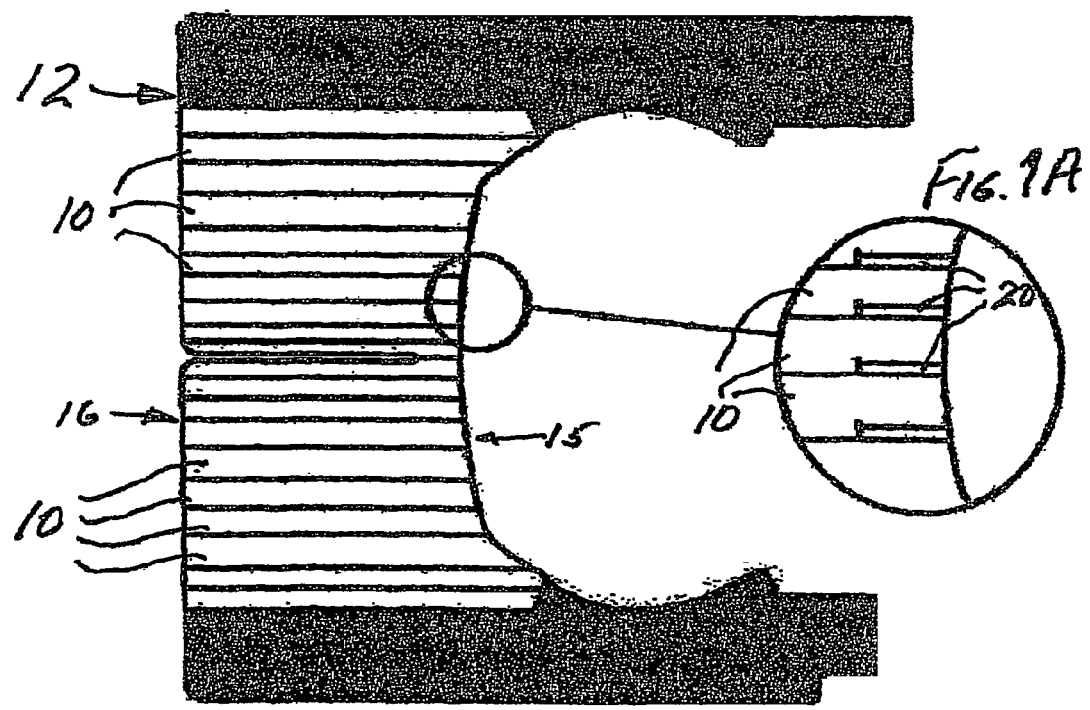
FIG. 1 is a cross-sectional view through the assembled two halves of a clam-shell type tire mold according to the invention.
Figure 2:
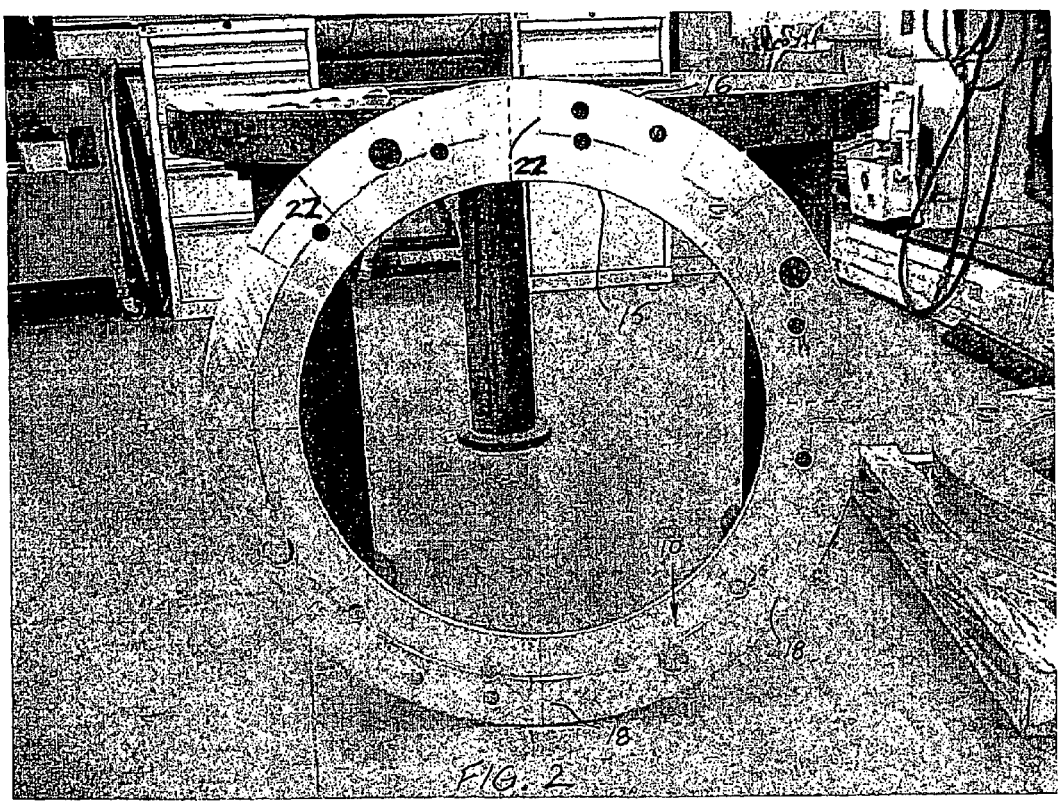
FIG. 2 is a perspective view of one of the annular plates incorporated in a clam-shell type mold.
Figure 3:
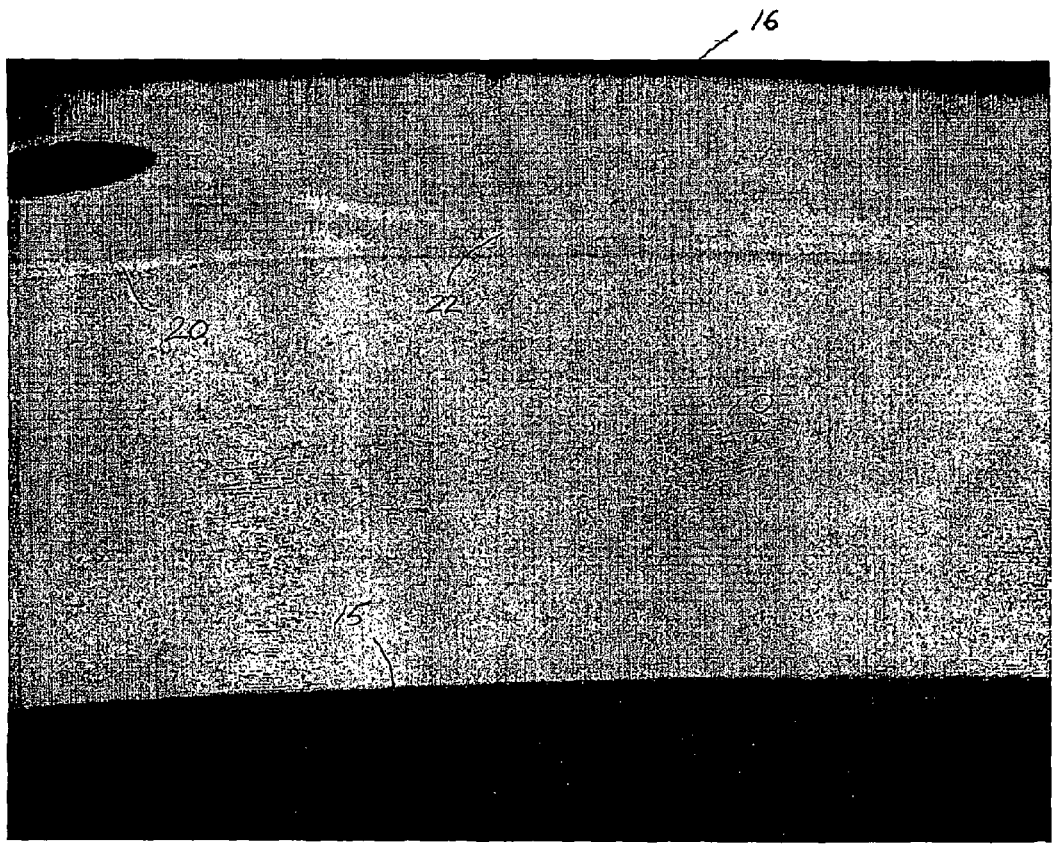
Figure 5:
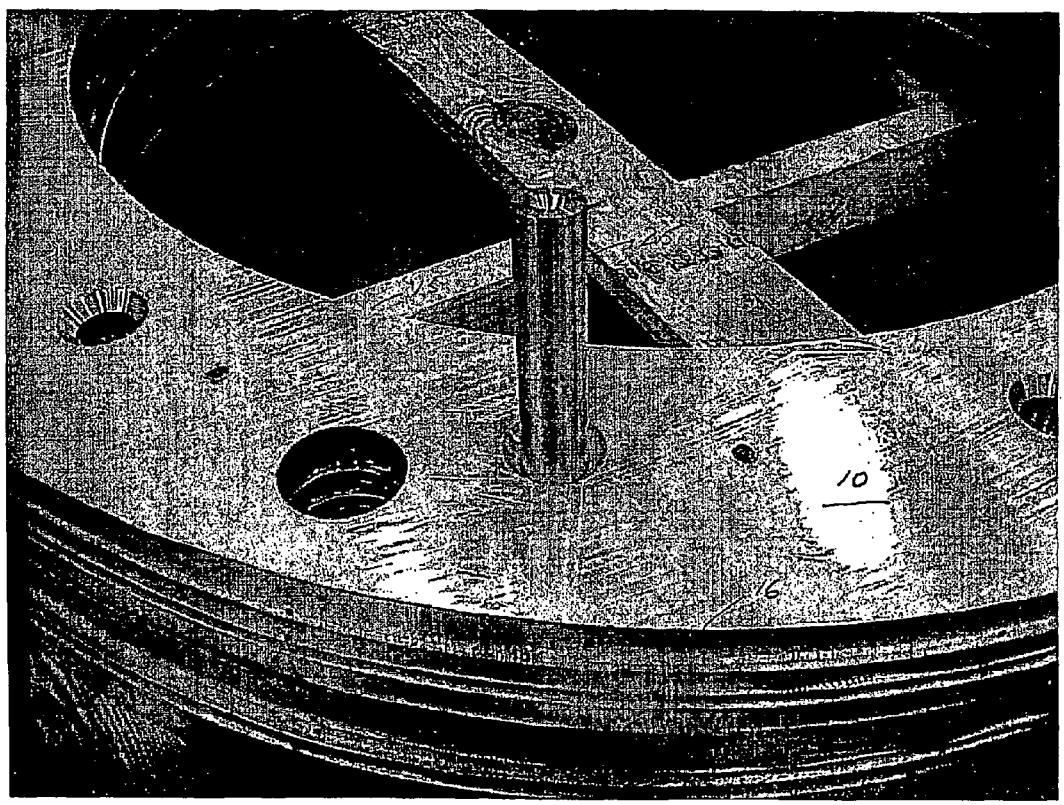
FIG. 5 is a view of a partial stack of the plates over one of the alignment pins.

The annular plates 10 which make up the interior of the mold 12 are shown in FIGS. 1-5 include an inner hole defined by the inner diameter 15 and outer diameter 16. For a segmented mold embodiment plates 10 can be divided, for example into four or more parts (eight segments are commonly used in segmented molds), as indicated by the dash lines 18 in FIG. 2. Although some plates may be of greater thickness (see FIG. 6), the majority of the plates are typically 1.000 inch or less in thickness, with their sides parallel in the preferred constructions. From the inner diameter (FIGS. 2, 3 and 4) at least one side of the plate is machined to a substantially uniform depth and over a predetermined area to produce a gap 20 when the plates are stacked together. The gaps 20 are quite thin, in the range of approximately 0.002 to 0.008 inches in depth and extend inward, away from the inner radius, for approximately 1.00 inch (2.54 cm) or less. In an actual embodiment of the invention a gap 20 in the order of approximately 0.004 inch provided adequate venting, while substantially preventing flow of rubber into the gaps.

In the outer region (full thickness) of the plates, vent passages 22 are formed (FIG. 3) at a depth and width of approximately 0.060 inches, and extending from, and connecting with, the gaps 20 to the outer radius of the plates, and out the back or exterior of the mold.

The plates 10 are stacked one upon the other (FIGS. 5 & 6) over alignment pins 25 which have internally threaded ends (FIG. 7) which receive flathead bolts 27 (FIG. 8) when the full complement of plates is assembled. In the case of segmented molds, a single alignment pin and bolts can be used to secure the plates of the segment together in a single stack.

Thus, the interior edges of the plates form the basis of an interior torroidal surface into which a tread mold can be created or machined, for example by engraving. The gaps 20 extend over a substantial length around the mold, as well as being spaced apart across the mold by the thickness (depth) of the plates into which the gaps are formed.

The multiple plates that comprise the mold can be formed from steel or aluminum, without significantly changing the size and weight of the tire molds.

The preferred embodiment of the present invention has substantial differences and advantageous results when compared with the prior art molds and methods of manufacturing tire molds. For example, the prior art puzzle mold is vented in the lateral direction and leaves zigzag vent lines on the tire formed by the cavities of the die cast pieces that are fitted together. The present invention, on the other hand, will leave a straight circumferential line around the tire formed by the cavities between the tread plates. The preferred embodiment described herein will be less costly since approximately twenty (20) to thirty (30) tooling plates are fit together and then the tread pattern engraved (machined) in an interior surface. Known molds die cast hundreds of small tread pieces and fit the pieces together to form a tread pattern. In addition, the present arrangement has the advantage of being adapted for use in either a two-piece clamshell type of mold or a segmented mold while the prior art will only work in segmented molds.

In summary, the present invention vents the tread area of the tire, during curing, without using conventional microvents or drill vents. As the bladder inflates on the curing press and forces the green tire into the tire mold, any air trapped between the green tire and the mold is provided a path from the mold cavity by gaps between the plates. Air is allowed to escape out of the mold so as not to cause lightness or trapped air. Approximately thirteen (13) plates are used per mold half, although a greater or lesser number of multiple plates can be used without departing from the scope and intent of the present invention. The gaps are preferably formed by machining the plates, and the gaps communicate with a circumferential channel and then out the back of the mold through a radial channel. Again, one skilled in the art will appreciate that alternative channel configurations that communicate with the gaps can be used to effectively and advantageously vent the air from the mold.

While the methods herein described, and the resulting mold, constitute preferred embodiments of this invention, it is to be understood that the invention is not limited to these precise methods and mold constructions, and that changes may be made in either without departing from the scope of the invention, which is defined in the appended claims.

What is claimed is:

1. Preparing a plurality of plates which will define an interior tread pattern within a tire mold, said plates having an inner predetermined radius, an outer predetermined radius, and substantially parallel sides extending between said inner radius and said outer radius, comprising the steps of
   a) machining at least one discrete region to a shallow depth on at least one side of the plates from its inner radius part way toward its outer radius,
   b) thereafter stacking and securing the machined plates together with the inner radius' of abutting plates extending in a circumferential direction and thereby producing first gaps at the discrete regions between the surfaces of adjacent plates, the first gaps extending substantially radially from the inner radius toward the outer radius,
   c) forming second gaps at a depth and width greater than the first gaps and extending directly from, with no intermediate passageways, connecting with an in alignment to the first gaps in the outer full thickness region of the plates, to form vent passages between adjacent plates in a depth of approximately 0.060 inches and extending from the first gaps to the outer radius of the plates, and thus venting outward through the stacked plates to the back of the mold.

2. The method defined in claim 1, wherein during step (a) the discrete regions are machined to a depth in the order of 0.002 to 0.008 inches.

3. The method defined in claim 2, wherein during step (a), said at least one discrete region extends from the inner radius toward the outer radius for approximately 1.00 inch or less.

4. The method defined in claim 1, wherein the majority of the plates are typically about 1.000 inch or less in thickness.

5. The method defined in claim 1 wherein during step (b), the plates are stacked one upon the other over alignment pins.

6. The method defined in claim 5 wherein during the step (b), the alignment pins have threaded ends receiving threaded flathead fasteners when the full complement of plates is assembled.

7. The method defined in claim 1, wherein the plates are stacked and joined as two separate cooperative parts of a clam-shell mold.

8. The method defined in claim 1, wherein the plates are stacked and joined as discrete parts of a segmented mold.

9. The method defined in claim 1 wherein the interior radius edges of the assembled plates are engraved with the pattern of a tire tread to be molded on a tire placed within the mold.

10. A method for preparing a plurality of plates which will define an interior tread pattern within a tire mold, said plates having an inner predetermined radius, an outer predetermined radius, and substantially parallel sides extending between said inner radius and said outer radius, comprising the steps of
   a) machining at least one discrete region to a shallow depth on at least one side of the plates from its inner radius part way toward its outer radius,
   b) thereafter stacking and securing the machined plates together with the inner radius of abutting plates extending in a circumferential direction and thereby producing first gaps at the discrete regions between the surfaces of adjacent plates, the first gaps extending substantially radially from the inner radius toward the outer radius;
   c) forming second gaps at a depth and width greater than the first gaps and in alignment to the first gaps, said second gaps extending from, with no intermediate passageways, and connecting with the first gaps to said outer radius to form vent passages between adjacent plates and thus venting outward through the stacked plates to the back of the mold.

11. The method defined in claim 10, wherein during step (a) the discrete regions are machined to a depth in the order of 0.002 to 0.008 inches.

12. The method defined in claim 11, wherein during step (a), said at least one discrete region extends from the inner radius toward the outer radius for 1.00 inch or less.

13. The method defined in claim 10, wherein the majority of the plates are 1.000 inch or less in thickness.

14. The method defined in claim 10, wherein during step (b), the plates are stacked one upon the other over alignment pins.

15. The method defined in claim 14, wherein during the step (b), the alignment pins have threaded ends receiving threaded flathead fasteners when the full complement of plates is assembled.

16. The method defined in claim 10, wherein the plates are stacked and joined as two separate cooperative parts of a clam-shell mold.

17. The method defined in claim 10, wherein the plates are stacked and joined as discrete parts of a segmented mold.

18. The method defined in claim 10 wherein the interior radius edges of the assembled plates are engraved with the pattern of a tire tread to be molded on a tire placed within the mold.

19. A mold for the formation of tread patterns on tires comprising:

a plurality of mold sections each including a plurality of machined arcuate or annular plate-like parts, said machined parts having (a) an outer radius (b) an inner radius extending in a circumferential direction and substantially parallel faces extending between said outer radius and said inner radius, and having a first set of machined regions in a minor portion of said faces extending from the inner radius toward said outer radius, said machined parts assembled and secured face to face in a stack, the parts having substantially common inner and outer radii and defining a set of gaps between adjacent plates of the assembled plate-like parts, the plurality of plate-like parts also having a second set of machined regions adjacent to and opening into the outer radius of the assembled plate-like parts defining radially extending vent passages between adjacent plates larger than and aligned with said gaps and extending directly from, with no intermediate passageways, and connecting with the gaps to the outer radius of the plates, thereby providing outward venting of the stacked plate-like parts to the back of the mold, and the radially inward edges of the assembled plate-like parts forming a surface having at least a portion of a tire tread mold formed thereon.

20. A mold as defined in claim 19, wherein the depth of the first set of machined regions being in the range of 0.002 to 0.008 inches and the vent passages have a size of approximately 0.060 inches.

* * * * *